(12) United States Patent
Ohno (10) Patent No.: US 11,338,716 B2
(45) Date of Patent: May 24, 2022

(54) VEHICLE FOOTREST

(71) Applicant: Toyota Jidosha Kabushiki Kaisha, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 16/737,198

(22) Filed: Jan. 8, 2020

(65) Prior Publication Data
US 2020/0223343 A1 Jul. 16, 2020

(30) Foreign Application Priority Data

Jan. 15, 2019 (JP) .............................. JP2019-004687

(51) Int. Cl.
*B60N 3/06* (2006.01)
*B60R 21/02* (2006.01)
*B60R 21/00* (2006.01)

(52) U.S. Cl.
CPC .............. *B60N 3/066* (2013.01); *B60R 21/02* (2013.01); *B60R 2021/0032* (2013.01); *B60R 2021/0046* (2013.01); *B60R 2021/0273* (2013.01)

(58) Field of Classification Search
CPC .......... B60N 3/066; B60N 3/06; B60N 2/427; B60R 21/02; B60R 2021/0046; B60R 2021/0032; B60R 2021/0273
See application file for complete search history.

(56) References Cited

U.S. PATENT DOCUMENTS

| 1,311,940 | A  | * | 8/1919 | Young | .................... | B60N 3/063 |
|---|---|---|---|---|---|---|
|  |  |  |  |  |  | 296/75 |
| 2004/0206568 | A1 | * | 10/2004 | Davis | ....................... | B60N 2/38 |
|  |  |  |  |  |  | 180/311 |
| 2014/0001787 | A1 | * | 1/2014 | Miller | .................... | B60N 3/066 |
|  |  |  |  |  |  | 296/75 |
| 2014/0008904 | A1 | * | 1/2014 | Ahn | ........................ | B60R 21/02 |
|  |  |  |  |  |  | 280/748 |
| 2019/0232847 | A1 | * | 8/2019 | Kim | ......................... | B60R 7/04 |

FOREIGN PATENT DOCUMENTS

| CN | 108945111 | A | * | 12/2018 | | |
|---|---|---|---|---|---|---|
| CN | 112061004 | A | * | 12/2020 | | |
| DE | 19727598 | A1 | * | 1/1999 | ............. | B60R 21/16 |

(Continued)

OTHER PUBLICATIONS

Machine Translation of JP 2017105409 (Year: 2017).*

*Primary Examiner* — Paul N Dickson
*Assistant Examiner* — Kurtis Nielson
(74) *Attorney, Agent, or Firm* — Dinsmore & Shohl LLP (57) ABSTRACT

A vehicle footrest includes a footrest body that is disposed at a seat front side of a vehicle seat and that is configured to support a foot of an occupant; a restraining member that is provided at a toe-side end portion of the footrest body, and that is movable between a restraining position covering the foot of the occupant from a seat upper side and a retracted position retracted from the restraining position; and a moving mechanism configured to move the restraining member from the retracted position to the restraining position at a time of vehicle collision in which the occupant moves toward the seat front side due to inertia.

7 Claims, 7 Drawing Sheets

(56) References Cited

FOREIGN PATENT DOCUMENTS

| | | | | |
|---|---|---|---|---|
| GB | 2408027 A | * | 5/2005 | ....... B60R 21/23184 |
| JP | H03-182852 A | | 8/1991 | |
| JP | 10323258 | | 12/1998 | |
| JP | 2017-039402 A | | 2/2017 | |
| JP | 2017105409 A | * | 6/2017 | ............. B60N 3/066 |
| JP | 2018-052347 A | | 4/2018 | |
| KR | 20090062833 A | * | 6/2009 | |

\* cited by examiner

VEHICLE FOOTREST

CROSS-REFERENCE TO RELATED APPLICATION

This application claims priority under 35 USC 119 from Japanese Patent Application No. 2019-004687, filed on Jan. 15, 2019 the disclosure of which is incorporated by reference herein.

BACKGROUND

Technical Field

The present disclosure relates to a vehicle footrest.

Related Art

Japanese Patent Application Laid-Open (JP-A) No. H10-323258 discloses a structure in which a support member is provided to a seat cushion of a vehicle seat, and a footrest is attached to the support member such that collision load is not transmitted into the footrest even if a dash panel deforms in a vehicle collision.

However, for example, in a vehicle collision in which an occupant moves toward the seat front side under inertia, such as a frontal collision of a vehicle that occurs in a state in which the vehicle seat is facing toward the vehicle front side, the feet resting on the footrest might lurch upward such that the feet come away from the footrest. A countermeasure to this might be to adopt a method of covering the feet resting on the footrest from the seat upper side using a restraining member or the like. However, this would make it mote difficult for the occupant to rest their feet on the footrest, and would be detrimental to comfort.

SUMMARY

The present disclosure provides a vehicle footrest capable of improving collision safety while also securing comfort.

A vehicle footrest according to a first aspect of the present disclosure includes a footrest body that is disposed at a seat front side of a vehicle seat and that is configured to support a foot of an occupant; a restraining member that is provided at a toe-side end portion of the footrest body, and that is movable between a restraining position in which the restraining member covers the foot of the occupant from a seat upper side and a retracted position retracted from the restraining position; and a moving mechanism configured to move the restraining member from the retracted position to the restraining position at a time of vehicle collision in which the occupant moves toward the seat front side due to inertia.

In the vehicle footrest according to the first aspect of the present disclosure, the footrest body is disposed at the seat front side of the vehicle seat, and the footrest body is configured to support the foot of the occupant. The restraining member is provided at the toe-side end portion of the footrest body, and the restraining member is movable between the restraining position covering the foot of the occupant from the seat upper side and the retracted position retracted from the restraining position. In a vehicle collision in which the occupant moves toward the seat front side under inertia, the moving mechanism moves the restraining member from the retracted position to the restraining position. Accordingly, for example, in a frontal collision of the vehicle that occurs in a state in which the vehicle seat is facing toward the front side of the vehicle, the restraining member is moved to the restraining position by the moving mechanism, such that the toes of the occupant are covered from the seat upper side by the restraining member. Thereby, the foot of the occupant may be suppressed from lurching upward from the footrest body.

Since the restraining member is provided capable of moving to the retracted position, the restraining member does not get in the way when the occupant rests their feet on the footrest body during normal driving prior to a collision. Thereby, comfort may be secured.

In a second aspect of the present disclosure, in the first aspect, the restraining member may include: a restraint portion rotatably attached to a rotation shaft provided at the footrest body such that the restraint portion extends from the rotation shaft toward a seat rear side when at the restraining position, and a mass retaining portion extending from the rotation shaft toward the seat front side when at the restraining position; and the moving mechanism includes an inertial mass that is retained by the mass retaining portion.

In the vehicle footrest according to the second aspect of the present disclosure, the restraint portion of the restraining member extends toward one end side of the rotation shaft, and the mass retaining portion that retains the inertial mass extends toward the other end side of the rotation shaft. Accordingly in a vehicle collision, an inertial force acts on the inertial mass such that the inertial mass rotates about the rotation shaft, thereby moving the restraining member to the restraining position.

In a third aspect of the present disclosure, in the second aspect, a distance from the rotation shaft to the inertial mass may be shorter than a distance from the rotation shaft to a leading end of the restraint portion.

In the vehicle footrest according to the third aspect of the present disclosure, the movement distance of the inertial mass in a rotation direction from the retracted position toward the restraining position in a vehicle collision may be made shorter than in cases in which the distance from the rotation shaft to the inertial mass is longer than the distance from the rotation shaft to the leading end of the restraint portion, or in cases in which the two distances are the same as each other.

A fourth aspect of the present disclosure, in any one of the first aspect to the third aspect, further include a locking mechanism configured to fix the restraining member at the restraining position.

In the vehicle footrest according to the fourth aspect of the present disclosure, in a state in which the restraining member has moved from the retracted position to the restraining position, the restraining member is fixed at the restraining position by the locking mechanism.

In a fifth aspect of the present disclosure, in any one of the second aspect to the fourth aspect, the restraining member may be biased toward the retracted position by a biasing member.

In the vehicle footrest according to the fifth aspect of the present disclosure, the restraining member is biased toward the retracted position, such that the restraining member is less liable to vibrate during normal driving.

In a sixth aspect of, the present disclosure, in any one of the second aspect to the fourth aspect, the restraining member may be supported by the footrest body such that the inertial mass is disposed further toward the seat front side than the rotation shaft when at the retracted position.

In the vehicle footrest according to the sixth aspect of the present disclosure, the inertial mass attempts to move to directly below the rotation shaft when at the retracted position, such that a force toward the retracted position about the rotation shall acts on the restraining member. Accordingly, the restraining member is less liable to vibrate during normal driving.

BRIEF DESCRIPTION OF THE DRAWINGS

An exemplary embodiment will be described in detail based on the following figures, wherein.

DETAILED DESCRIPTION

Explanation follows regarding a vehicle footrest 10 according to an exemplary embodiment, with reference to the drawings. In the drawings, the arrow FR indicates a seat forward direction, and the arrow UP indicates a seat upward direction as appropriate. In the following explanation, unless specifically stated otherwise, reference to front, rear, left, right, upward, and downward directions is taken to refer the front and rear in a seat front-rear direction, left and right in a seat width direction, and upward and downward in a seat vertical direction.

Figure 1:
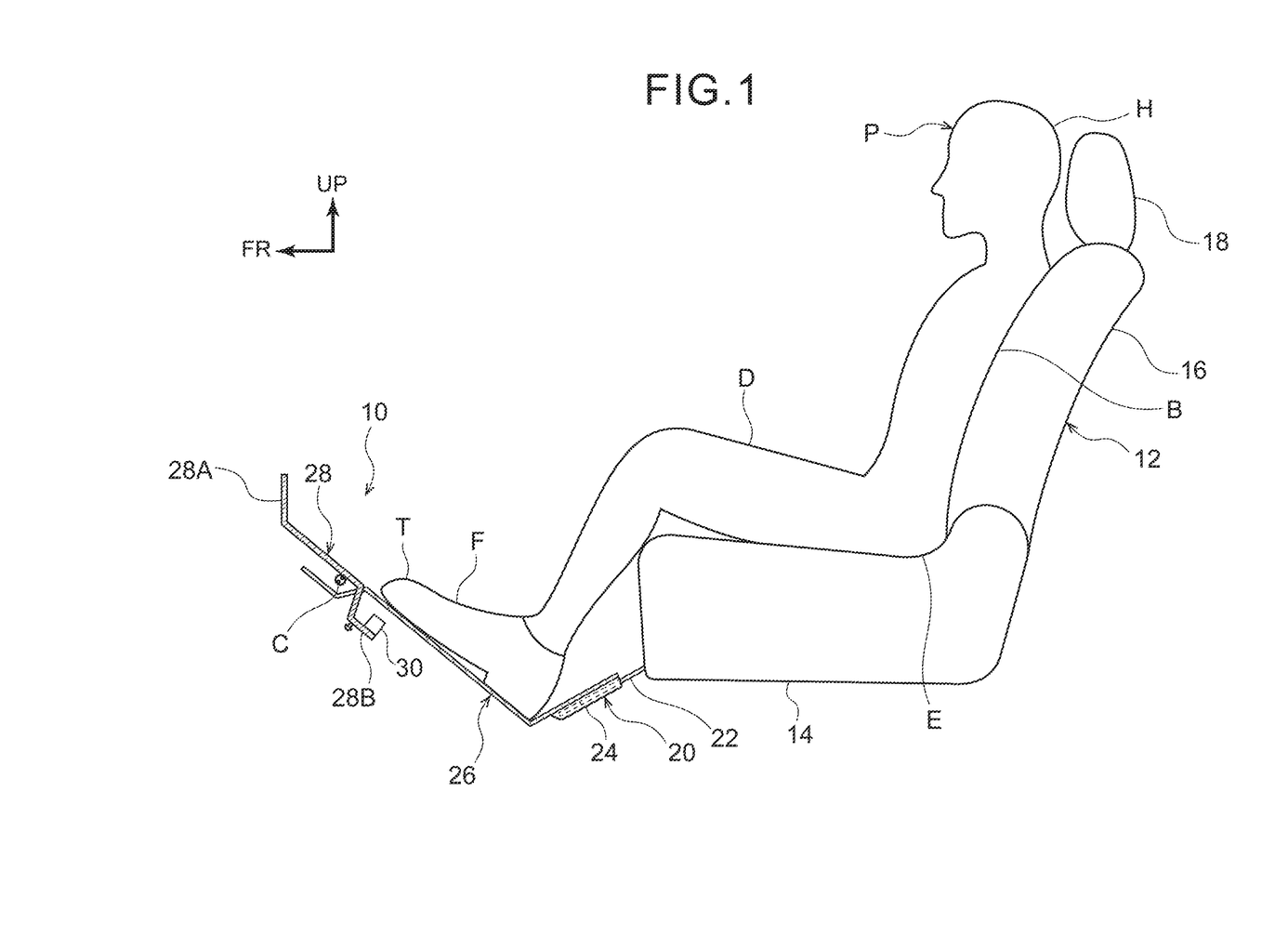
FIG. 1 is a side view illustrating a vehicle footrest and a vehicle seat according to an exemplary embodiment.

As illustrated in FIG. 1, the vehicle footrest 10 (referred to hereafter simply as the "footrest 10") according to the present exemplary embodiment is disposed at the seat front side of a vehicle seat 12. The vehicle seat 12 is configured including a seat cushion 14, a seatback 16, and a headrest 18. Note that as an example in the present exemplary embodiment, the vehicle seat 12 faces toward the vehicle front side. The seat front side therefore corresponds to the vehicle front side.

The seat cushion 14 of the vehicle seat 12 extends in the seat front-rear direction and the seat width direction, and is configured to support the buttocks E and thighs D of an occupant P from the seat lower side. The seat cushion 14 is provided above a floor panel, not illustrated in the drawings. Note that the seatback 16 is coupled to a seat rear side end portion of the seat cushion 14.

The seatback 16 extends in the seat vertical direction and the seat width direction, and is configured to support the back B of the occupant P from the seat rear side. A lower end portion of the seatback 16 is pivotally coupled to the seat cushion 14 such that the seatback 16 is capable of tilting (reclining) with respect to the seat cushion 14.

The headrest 18 is provided at an upper end portion of the seatback 16. The headrest 18 is disposed at the seat rear side of the head H of the occupant P, and is configured capable of supporting the head H of the occupant P from the seat rear side. Note that the headrest 18 may be formed integrally to the seatback 16.

A coupling member 20 extends toward the seat front, side from a front end portion of the seat cushion 14. The coupling member 20 is configured including a coupling shaft 22 and an insertion portion 24. The coupling shaft 22 extends obliquely toward the seat front side and seat lower side from the front end portion of the seat cushion 14.

The insertion portion 24 is attached to a footrest body 26 of the footrest 10, described later, and the coupling shaft 22 is partially inserted into the insertion portion 24. The coupling member 20 is further provided with a height adjustment mechanism, not illustrated in the drawings, enabling the coupling shaft 22 to be fixed in a state inserted a desired length into the insertion portion 24. This enables the height of the vehicle footrest 10 to be adjusted according to the build and leg length of the occupant P.

Figure 2:
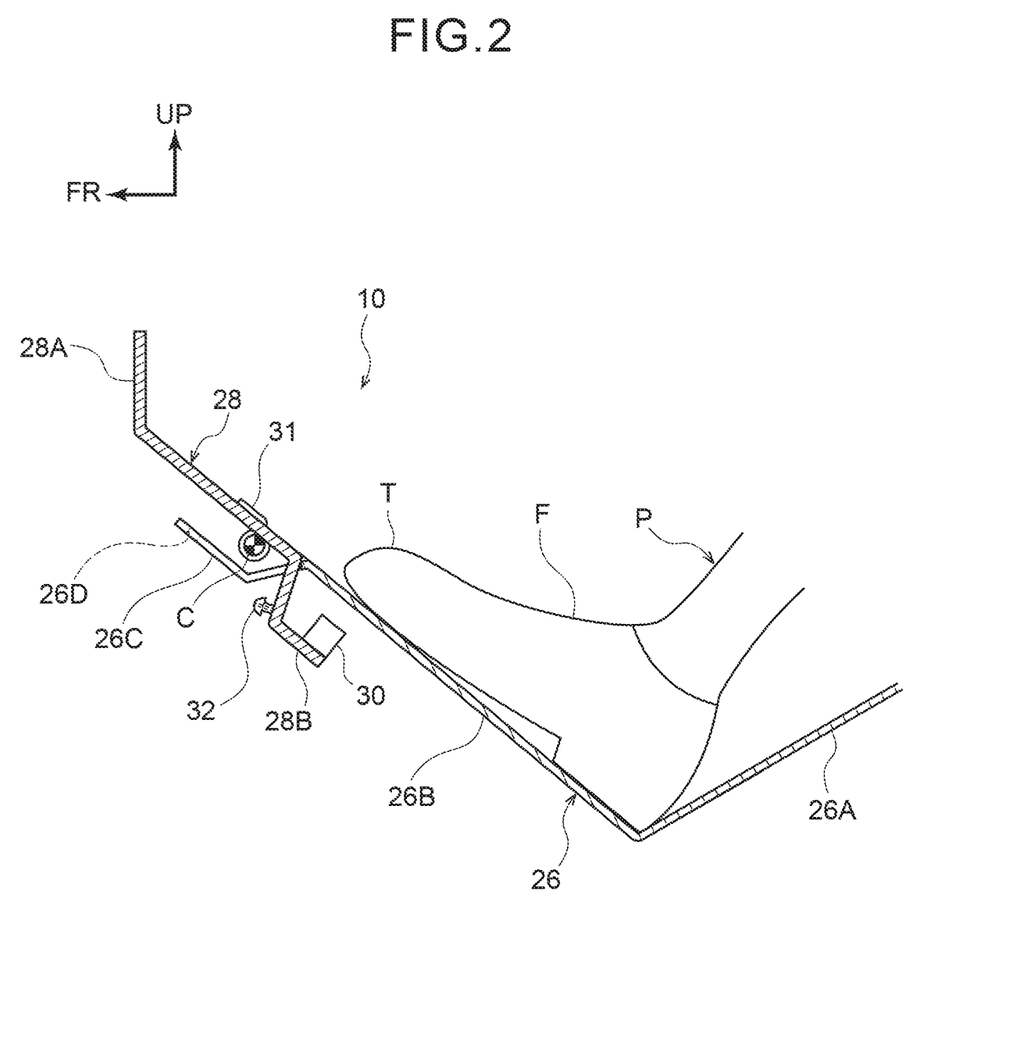
FIG. 2 is an enlarged view of relevant portions of a vehicle footrest of an exemplary embodiment in a state in which a restraining member is at a retracted position.

As illustrated in FIG. 2, the vehicle footrest 10 is configured including the footrest body 26, a restraining member 28, and an inertial mass 30, serving as a moving mechanism. The footrest body 26 is configured including a base portion 26A, a foot placement portion 26B, and a projection portion 26C.

The footrest body 26 is a member configured to support the feet F of the occupant P from the seat lower side. The base portion 26A of the footrest body 26 extends obliquely toward the seat front side and seat lower side from the seat rear side so as to follow the coupling member 20. The insertion portion 24 of the coupling member 20 is attached to a lower face of the base portion 26A (see FIG. 1). The foot placement portion 26B extends from a front end portion of the base portion 26A obliquely toward the seat front side and seat upper side.

The foot placement portion 26B is formed in a substantially flat planar shape. A face on which the feet F of the occupant P are placed faces toward the seat rear side and the seat upper side. The projection portion 26C projects toward the seat front side from a seat width direction central portion of the foot placement portion 26B. The projection portion 26C is formed integrally to the foot placement portion 26B, and extends from a front end portion of the foot placement portion 26B toward the seat front side, before bending toward the seat front side and seat upper side. The projection portion 26C is thus thrilled in a substantially L-shape as viewed along the seat width direction.

Figure 3:
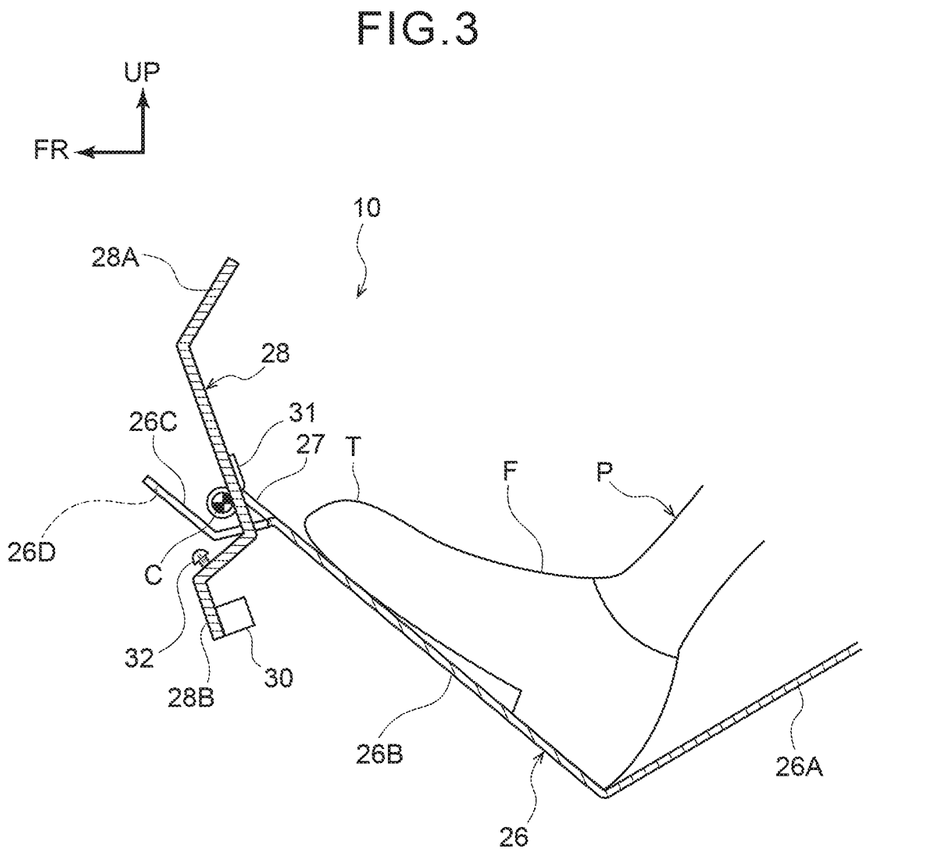
FIG. 3 is an enlarged view of relevant portions of a vehicle footrest of an exemplary embodiment in a state in which a restraining member is between a retracted position and a restraining position.
Figure 4:
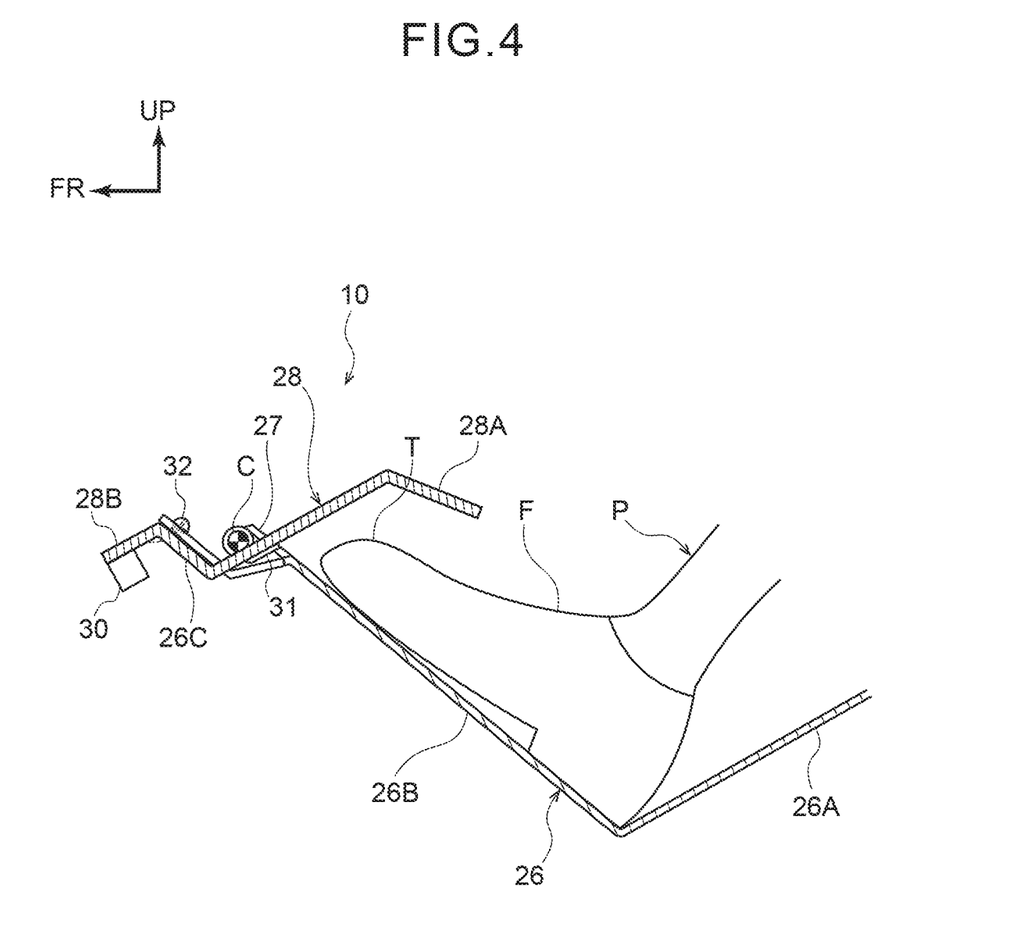
FIG. 4 is an enlarged view of relevant portions of a vehicle footrest of an exemplary embodiment in a state in which a restraining member is locked at a restraining position.

As illustrated in FIG. 3 and FIG. 4, an attachment tab 27 branches from the projection portion 26C at a front end portion of the foot placement portion 268 and extends toward the seat front side and seat upper side. A rotation shaft C is attached to the attachment tab 27. The restraining member 28 is rotatably attached to the rotation shaft C. Note that FIG. 2 illustrates a state in which the restraining member 28 is at a retracted position, and FIG. 4 illustrates a state in which the restraining member 28 is at a restraining position.

As illustrated in FIG. 4, the restraining member 28 is provided at the front end portion (at a toe T side end portion) of the footrest body 26. The restraining member 28 is configured including a restraint portion 28A that extends from the rotation shaft C toward the seat rear side when at the restraining position, and a mass retaining portion 288 that extends from the rotation shaft C toward the seat front side when at the restraining position. The restraint portion 28A and the mass retaining portion 28B are formed integrally to each other.

The restraint portion 28A is a location of the restraining member 28 on one side of the rotation shaft C. At the restraining position illustrated in FIG. 4, the restraint portion 28A extends from the rotation shaft C toward the seat rear side and the seat upper side. A leading end of the restraint portion 28A is bent toward the seat rear side and the seat lower side, and this portion is disposed so as to cover the toes T of the occupant P from the seat upper side.

As illustrated in FIG. 2, when at the retracted position the restraint portion 28A extends from the rotation shaft C toward the seat front side and the seat upper side so as to be substantially parallel to the foot placement portion 26B of the footrest body 26. Accordingly, when at the retracted position, the leading end of the restraining member 28 is disposed at a position away from (retracted from) the toes T.

The mass retaining portion 28B is a location of the restraining member 28 on the other side of the rotation shaft C. The inertial mass 30 is attached to a leading end portion of the mass retaining portion 28B. The inertial mass 30 is a metal block formed by a member sufficiently greater in mass than the restraining member 28. Accordingly, in a non-loaded state, the inertial mass 30 attempts to move to directly below the rotation shaft C.

In the present exemplary embodiment, a torsion spring 31, serving as a biasing member, is provided to the rotation shaft C, such that the restraining member 28 is biased toward the retracted position by the torsion spring 31. The restraining member 28 is locked to the footrest body 26 when at the retracted position, suppressing the restraining member 28 from rotating away from the retracted position. A state is thus adopted in which the restraining member 28 does not rotate away from the retracted position due to the biasing force of the torsion spring 31.

Moreover, in the present exemplary embodiment, the restraining member 28 is formed such that a distance from the rotation shaft C to the inertial mass 30 is shorter than a distance from the rotation shaft C to the leading end of the restraint portion 28A.

Figure 5:
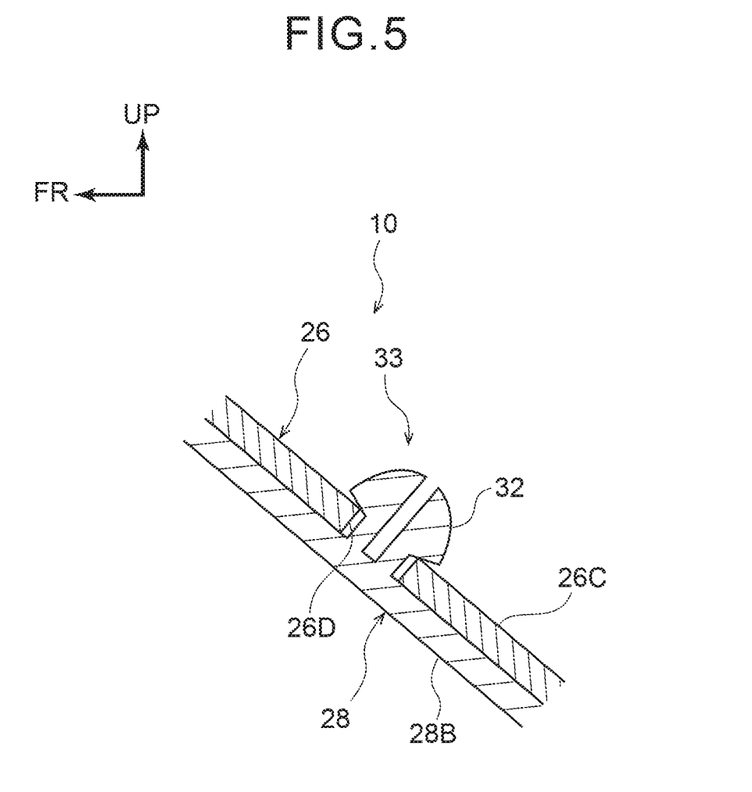
FIG. 5 is an enlarged cross-section of relevant portions to explain a locking mechanism of a vehicle footrest according to an exemplary embodiment.

As illustrated in FIG. 5, in the present exemplary embodiment, a locking mechanism 33 is provided to fix the restraining member 28 at the restraining position. The locking mechanism 33 is configured including a protrusion 32 formed to the mass retaining portion 28B of the restraining member 28, and an insertion hole 26D formed in the projection portion 26C of the footrest body 26. The insertion hole 26D is formed at a position that corresponds to the protrusion 32 in a state in which the restraining member 28 has rotated to the restraining position, such that at the restraining position the protrusion 32 is irremovably inserted into the insertion hole 26D, thus fixing the restraining member 28 at the restraining position.

Operation

Explanation follows regarding operation of the present exemplary embodiment.

As illustrated in FIG. 1, in the vehicle footrest 10 according to the present exemplary embodiment, the footrest body 26 is disposed at the seat front side of the vehicle seat 12, and the feet F of the occupant P may be supported from the seat lower side by the footrest body 26.

Moreover, the restraining member 28 is, provided to the toe T side end portion of the footrest body 26. In a vehicle collision in which the occupant P moves toward the seat front side under inertia, the restraining member 28 moves from the retracted position to the restraining position, such that the toes T of the occupant are covered from the seat upper side by the restraining member 28. This enables the feet F of the occupant P to be suppressed from lurching upward from the footrest body 26. This operation will now be explained with reference to FIG. 2 to FIG. 4.

As illustrated in FIG. 2, in a state prior to a vehicle collision, the restraining member 28 is at the retracted position. Moreover, the restraining member 28 is biased toward the retracted position (in a counterclockwise direction) by the torsion spring 31.

As illustrated in FIG. 3, in a frontal collision of the vehicle, inertial force toward the seat front side acts on the inertial mass 30, such that the inertial mass 30 moves clockwise about the rotation shaft C against the biasing force of the torsion spring 31. The restraining member 28 accordingly rotates in a direction toward the restraining position.

As illustrated in FIG. 4, when the restraining member 28 has rotated as far as the restraining position, the toes T of the occupant P are covered from the seat upper side by the leading end of the restraint portion 28A of the restraining member 28. The feet F of the occupant P may thus be caught by the restraining member 28 when moving toward the seat upper side, enabling the feet F to be suppressed from lurching upward. This thereby enables the feet F to be suppressed from coming away from the vehicle footrest 10.

Supposing the feet F of the occupant P were to lurch upward and come away from the vehicle footrest 10, it is conceivable that the pelvis might be pulled by the feet F so as to move toward the seat front side. Were this to occur, it is conceivable that what is referred to as a submarining phenomenon might occur in which the occupant P plunges toward the seat front side. However, suppressing the feet F of the occupant P from lurching upward as in the present exemplary embodiment enables the occurrence of the submarining phenomenon to be suppressed. Moreover, in a vehicle installed with a restraint device such as a knee airbag, the feet F may be suppressed from leaving a restraint range of the restraint device, thereby enabling collision safety to be improved.

As illustrated in FIG. 2, in the present exemplary embodiment the restraining member 28 is moved to the retracted position during normal driving, such that the restraining member 28 does not get in the way when the occupant P rests their feet on the footrest body 26. This enables comfort to be secured. Accordingly, the vehicle footrest 10 of the present exemplary embodiment enables collision safety to be improved, while securing comfort.

Moreover, the present exemplary embodiment employs a structure in which the inertial force acting on the inertial mass 30 is used to move the restraining member 28 from the retracted position to the restraining position. This enables the feet F of the occupant P to be suppressed from lurching upward without the use of an electric actuator or the like.

In particular, in the present exemplary embodiment, the distance from the rotation shaft C to the inertial mass 30 is shorter than the distance from the rotation shaft C to the leading end of the restraint portion 28A. Accordingly, the movement distance of the inertial mass 30 in a rotation direction from the retracted position toward the restraining position in a vehicle collision may be made shorter than in cases in which the distance from the rotation shaft C to the inertial mass 30 is longer than the distance from the rotation shaft C to the leading end of the restraint portion 28A, or in cases in which the two distances are the same as each other. This enables the restraining member 28 to be moved swiftly to the restraining position in a vehicle collision.

Moreover, as illustrated in FIG. 5, in the present exemplary embodiment the vehicle footrest 10 is provided with the locking mechanism 33, such that when the restraining member 28 is at the restraining position, the protrusion 32 is irremovably inserted into the insertion hole 26D, enabling the restraining member 28 to be fixed at the restraining position. This enables the restraining member 28 to be suppressed from returning to the retracted position from the restraining position. Note that a groove is formed at a central portion of the protrusion 32 of the present exemplary embodiment, enabling the protrusion 32 to undergo elastic deformation so as to close up the groove, and thus allowing the protrusion 32 to be removed from the insertion hole 26D.

As illustrated in FIG. 2, in the present exemplary embodiment the restraining member 28 is biased toward the retracted position by the torsion spring 31. This thereby enables vibration of the restraining member 28 to be suppressed during normal driving, thus enabling the generation of noise resulting from vibration of the restraining member 28 to be suppressed.

Note that although the vehicle footrest 10 is provided to the vehicle seat 12 in the above exemplary embodiment, there is no limitation thereto. For example, the structure of a first modified example it in FIG. 6 may be employed. Moreover, although the restraining member 28 is biased toward the retracted position by the torsion spring 31, configuring a biasing member, in the above exemplary embodiment, there is no limitation thereto. For example, the structure of a second modified example illustrated in FIG. 7 may be employed.

FIRST MODIFIED EXAMPLE

Figure 6:
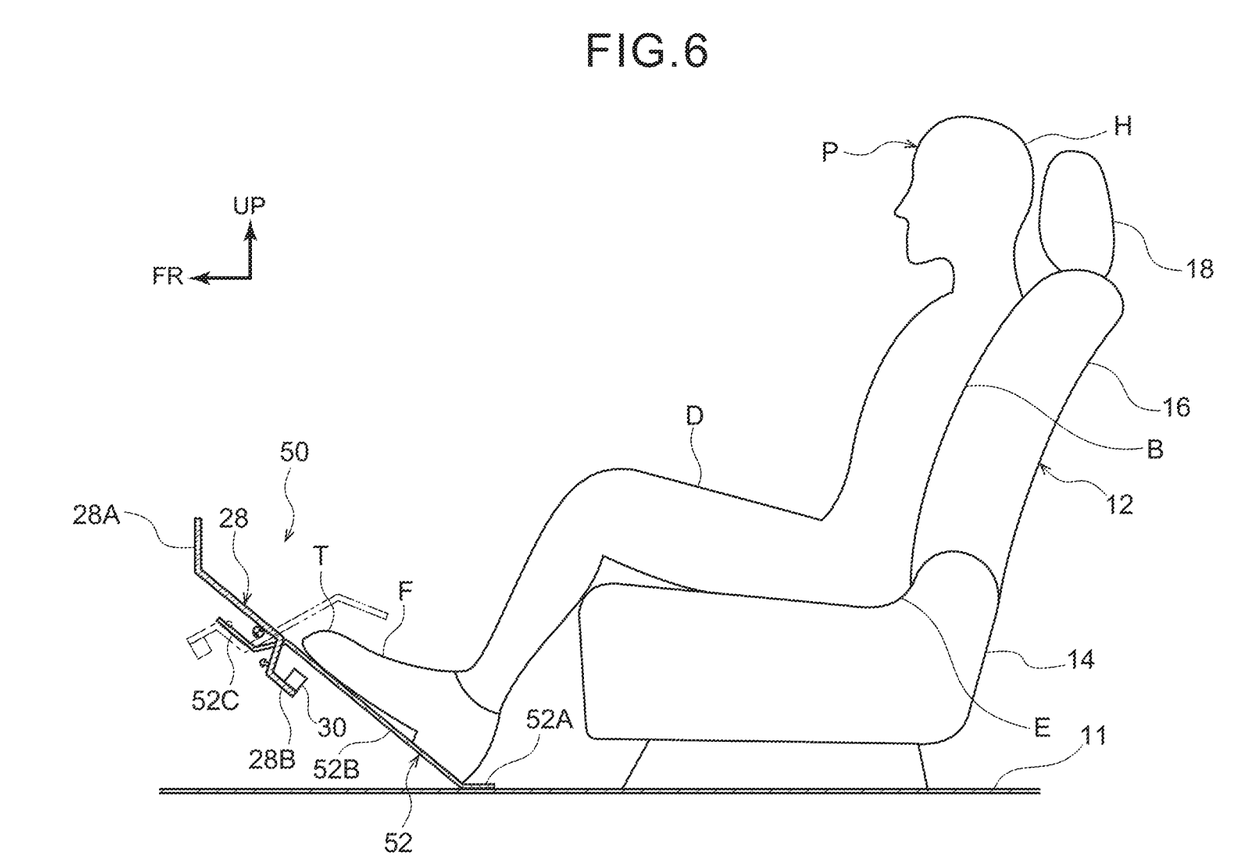
FIG. 6 is a side view corresponding to FIG. 1, illustrating a first modified example of a vehicle footrest according to an exemplary embodiment.

As illustrated in FIG. 6, a vehicle footrest 50 (referred to hereafter simply as the "footrest 50") according to a first modified example is provided on a floor panel 11. Specifically, the footrest 50 is configured including a footrest body 52, a restraining member 28, and an inertial mass 30 serving as a moving mechanism. The footrest body 52 is configured including a base portion 52A, a foot placement portion 52B, and a projection portion 52C.

The base portion 52A of the footrest body 52 is joined to the floor panel 11 in a state in which the base portion 52A is superimposed on the floor panel 11. The foot placement portion 52B extends obliquely toward the seat front side and seat upper side from a front end portion of the base portion 52A.

The foot placement portion 52B is form in a substantially flat planar shape, and a face on which the feet F of the occupant P are placed faces toward the seat rear side and seat upper side. The projection portion 52C projects toward the seat front side from a seat width direction central portion of the foot placement portion 52B. The projection portion 52C is formed integrally to the foot placement portion 52B, and extends from a front end portion of the foot placement portion 52B toward the seat front side, before bending toward the seat front side and seat upper side.

As described above, in a structure in which the footrest 50 is provided on the floor panel 11, the position of the footrest 50 relative to the seat cushion 14 may be adjusted by sliding the seat cushion 14 in the seat front-rear direction.

SECOND MODIFIED EXAMPLE

Figure 7:
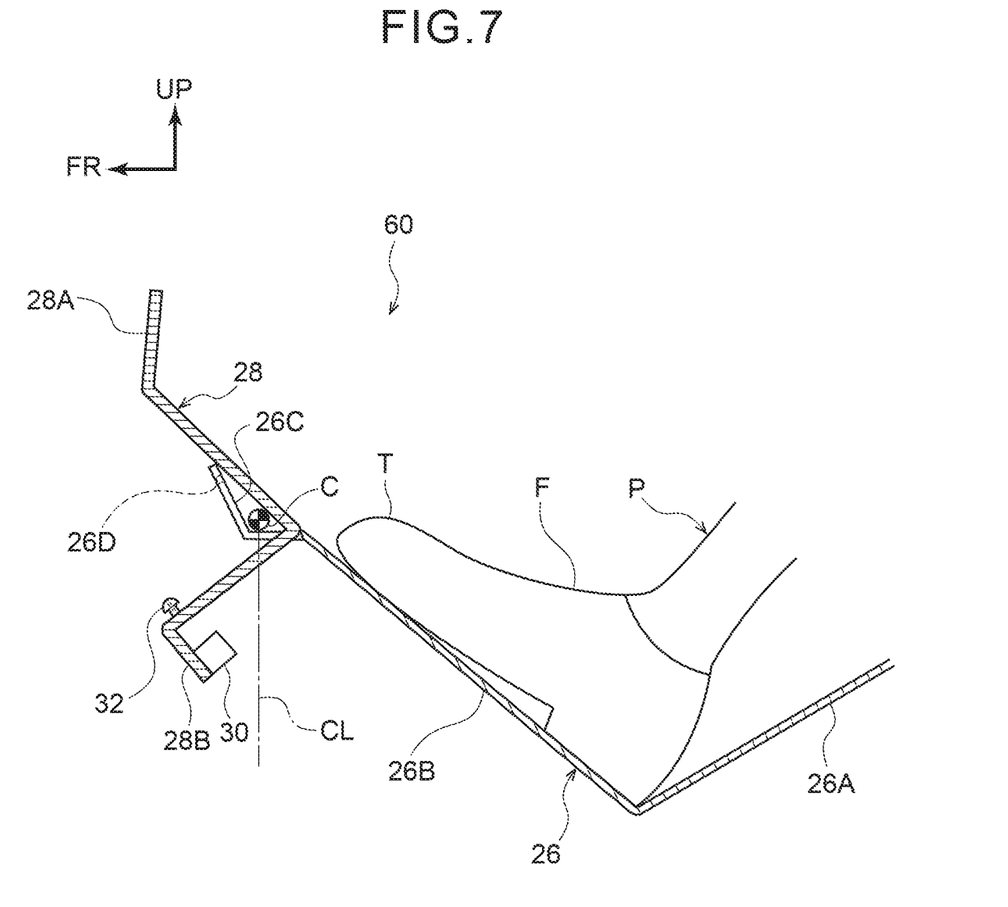
FIG. 7 is an enlarged view of relevant portions corresponding to FIG. 2, illustrating a second modified example of a vehicle footrest according to an exemplary embodiment.

Explanation follows regarding the second modified example. As illustrated in FIG. 7, a vehicle footrest 60 (referred to hereafter simply as the "footrest 60") according to the present modified example is configured including a footrest body 26, a restraining member 28, and an inertial mass 30 serving as a moving mechanism.

Note that in the present modified example, the shape of a mass retaining portion 28B of the restraining member 28 differs from that of the exemplary embodiment. Specifically, when at the retracted position, the restraint portion 28A of the restraining member 28 extends from the rotation shaft C toward the seat front side and seat upper side. The mass retaining portion 28B extends from the rotation shaft C toward the seat front side and seat lower side when at the retracted position, such that the restraining member 28 is formed substantially in a V-shape open toward the seat front side as viewed along the seat width direction. The restraint portion 28A and the mass retaining portion 28B are formed integrally to each other.

Note that the inertial mass 30 is attached to a leading end portion of the mass retaining portion 28B. The inertial mass 30 is, moreover, supported by the footrest body 26 so as to be disposed further toward the seat front side than the rotation shaft C. Namely, when at the retracted position illustrated in FIG. 7, the inertial, mass 30 is disposed at the seat front side relative to a phantom line CL running vertically through the center of the rotation shaft C. In this state, the restraining member 28 is anchored to the footrest body 26 such that the restraining member 28 does not rotate counterclockwise.

The projection portion 26C of the footrest body 26 is formed corresponding to the angle of the restraining member 28. Namely, the projection portion 26C is shaped such that when the restraining member 28 rotates to the restraining position, the protrusion 32 is inserted into the insertion hole 26D.

As described above, in the footrest 60 of the present modified example, the inertial mass 30 attempts to move to directly below the rotation shaft C when at the retracted position, such that a counterclockwise biasing force acts on the restraining member 28. This enables the restraining member 28 to be biased toward the retracted position without the use of a biasing member such as a torsion spring.

Although explanation has been given regarding vehicle footrests according to the exemplary embodiment and modified examples, obviously various configurations may be implemented within a range not departing from the spirit of the present disclosure. For example, in the above exemplary embodiment, the inertial mass 30 is employed as the moving mechanism, and the inertial force acting on the inertial mass 30 is utilized to move the restraining member 28 to the restraining position. However, there is no limitation thereto, and the restraining member 28 may be moved to the restraining position by another method. As an example, the restraining member 28 may be moved from the retracted position to the restraining position by a stepper motor. In such cases, configuration may be made in which a controller such as an electrical control unit (ECU) is electrically connected to the stepper motor, and the stepper motor is driven based on a signal from the ECU so as to move the restraining member 28 from the retracted position to the restraining position in a vehicle collision in which the occupant P moves toward the seat front side under inertia.

In the above exemplary embodiment, as illustrated in FIG. 5, the locking mechanism 33 is configured by the protrusion 32 of the restraining member 28 and the insertion hole 26D in the footrest body 26. However, there is no limitation thereto, and another structure may be employed. For example, an actuator such as a solenoid may be actuated in a state in which the restraining member 28 has moved to the restraining position so as to fix the restraining member 23 at the restraining position. Alternatively, a locking mechanism may be configured such that a protrusion is provided on the footrest body 26 side, and an insertion hole is formed on the restraining member 28 side.

In the above exemplary embodiment, as illustrated in FIG. 2, the torsion spring 31 is employed as a biasing member. However, there is no limitation thereto, and another biasing member may be employed. For example, a compression coil spring or a tension coil spring may be employed as a biasing member. In such cases, configuration may be made in which one end of the compression coil spring is attached to the restraining member 28, and the other end of the compression coil spring is attached to a floor panel or the footrest body 26 so as to bias the restraining member 28 toward the retracted position.

Moreover, in the above exemplary embodiment, a cushioning material may be provided on the face of the restraining member 28 on the side facing the toes T of the occupant P so as to protect the toes T of the occupant P.

What is claimed is:

1. A vehicle footrest, comprising:
    a footrest body that is disposed at a seat front side of a vehicle seat and that is configured to support a foot of an occupant;
    a restraining member that is provided at a toe-side end portion of the footrest body, and that is movable between a restraining position in which the restraining member covers the foot of the occupant from a seat upper side and a retracted position retracted from the restraining position; and
    a moving mechanism including an inertial mass configured to move the restraining member, by inertia, from the retracted position to the restraining position at a time of vehicle collision in which the occupant moves toward the seat front side.

2. The vehicle footrest of claim 1, wherein:
    the restraining member includes:
        a restraint portion rotatably attached to a rotation shaft provided at the footrest body such that the restraint portion extends from the rotation shaft toward a seat rear side when at the restraining position, and
        a mass retaining portion extending from the rotation shaft toward the seat front side when at the restraining position; and
    the inertial mass is retained by the mass retaining portion.

3. The vehicle footrest of claim 2, wherein a distance from the rotation shaft to the inertial mass is shorter than a distance from the rotation shaft to a leading end of the restraint portion.

4. The vehicle footrest of claim 2, wherein the restraining member is biased toward the retracted position by a biasing member.

5. The vehicle footrest of claim 2, wherein the restraining member is supported by the footrest body such that the inertial mass is disposed further toward the seat front side than the rotation shaft when at the retracted position.

6. The vehicle footrest of claim 1, further comprising a locking mechanism configured to fix the restraining member at the restraining position.

7. The vehicle footrest of claim 6, wherein:
    the locking mechanism includes a protrusion provided at the restraining member so as to be insertable into an insertion hole formed in the footrest body; and
    the protrusion is configured to be inserted into the insertion hole when at the restraining position so as to fix the restraining member at the restraining position.

* * * * *